Dec. 31, 1929.                    W. WILSON                    1,741,178
                                    BRAKE
                               Filed Oct. 6, 1928            2 Sheets-Sheet 1
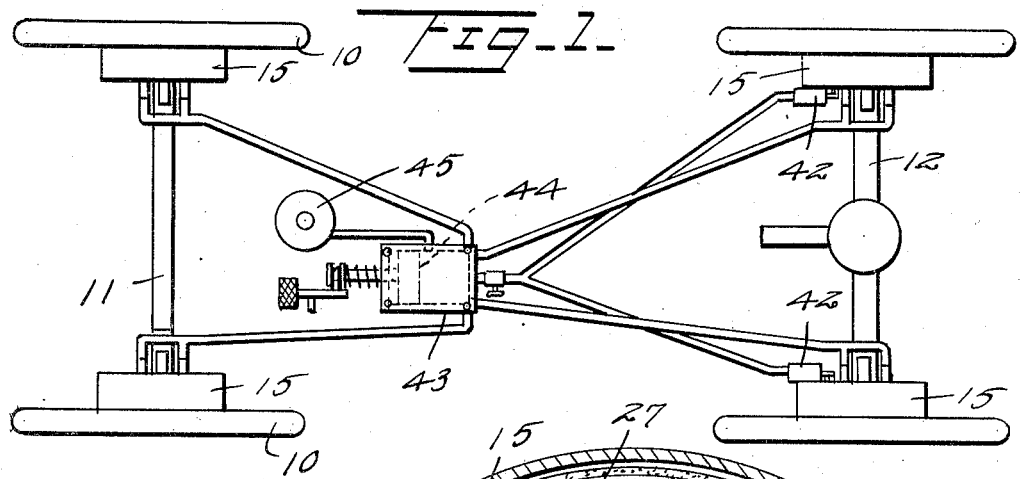
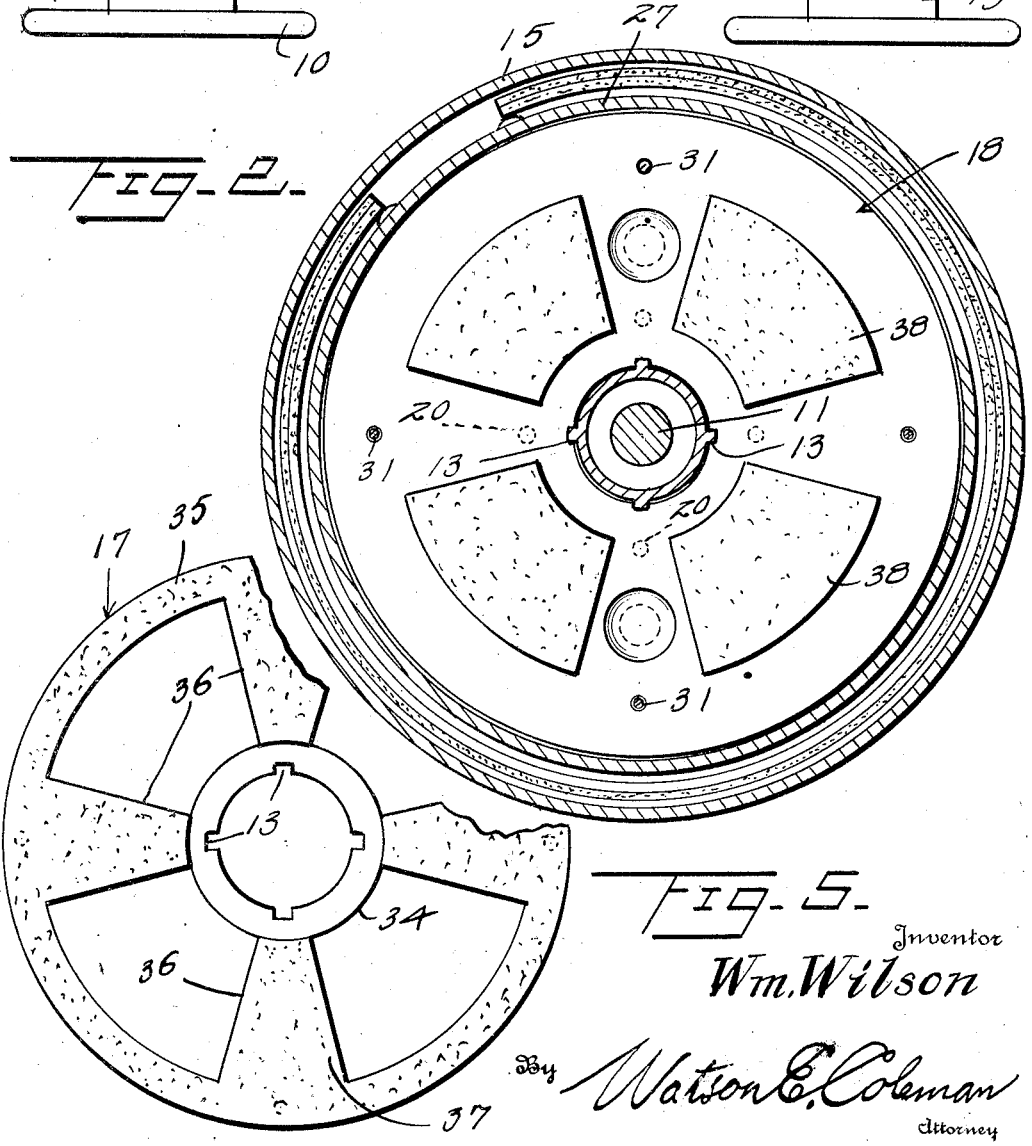
Inventor
Wm. Wilson
By Watson E. Coleman
              Attorney Dec. 31, 1929.  W. WILSON  1,741,178
BRAKE
Filed Oct. 6, 1928  2 Sheets-Sheet 2
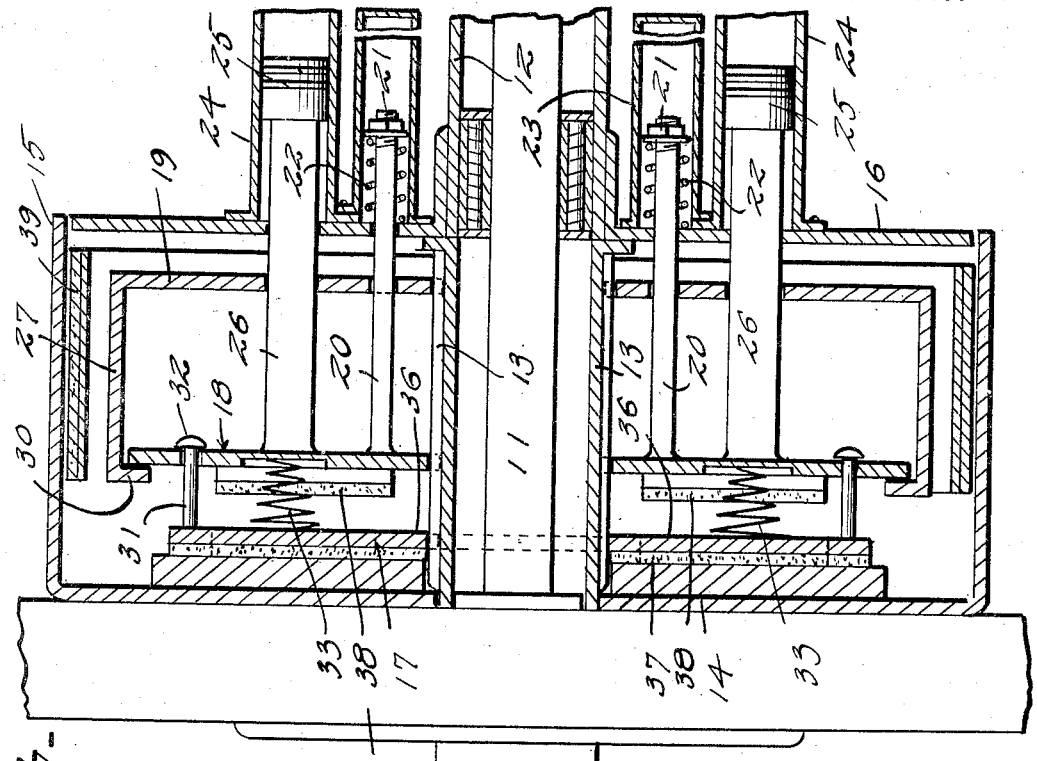
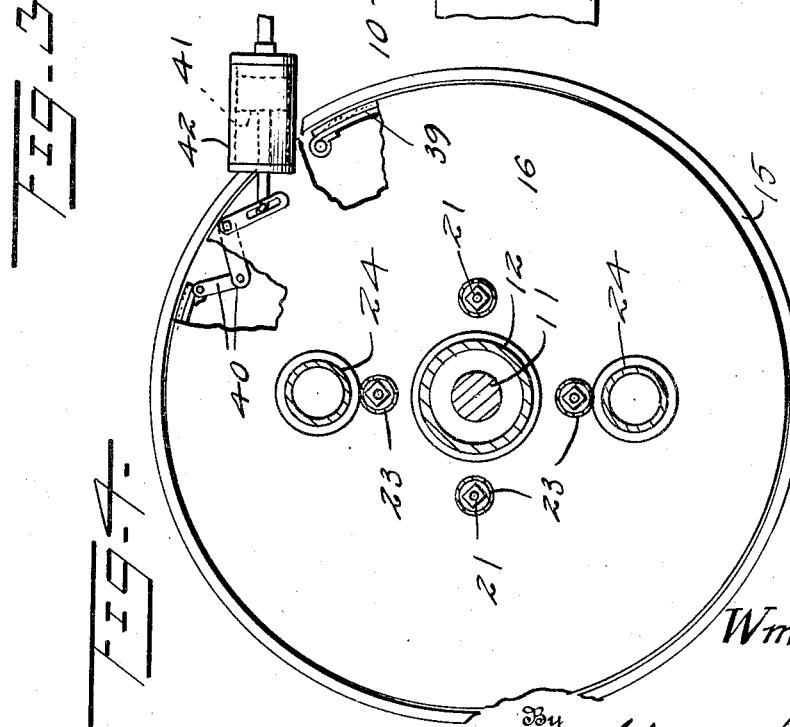
Inventor
Wm. Wilson
By Watson E. Coleman
Attorney Patented Dec. 31, 1929

1,741,178

UNITED STATES PATENT OFFICE

WILLIAM WILSON, OF TRENTON, NEW JERSEY, ASSIGNOR OF ONE-HALF TO JOSEPH HANDIS, OF TRENTON, NEW JERSEY

BRAKE

Application filed October 6, 1928. Serial No. 310,770.

This invention relates to brakes and more particularly to a hydraulically operated brake for vehicles.

An important object of the invention is to provide in a brake a construction such that the braking surface is proportionate to the pressure exerted in braking, so that a surface approximating the necessary surface is available for either light or heavy braking operations.

A further object of the invention is the provision of a structure of this character which may be very readily and cheaply manufactured and which may be readily applied to the vehicle wheel.

A still further object of the invention is to provide in a structure of this character an arrangement such that the ordinary band type of brake may be incorporated in the braking structure as a safety measure where desired.

These and other objects I attain by the construction shown in the accompanying drawings, wherein for the purpose of illustration is shown a preferred embodiment of my invention and wherein:—

Figure 1 is a diagrammatic view showing the connections of braking apparatus constructed in accordance with my invention;

Figure 2 is a transverse vertical sectional view showing the secondary braking plate;

Figure 3 is a longitudinal sectional view through the complete brake;

Figure 4 is a rear elevation of the brake partially in section;

Figure 5 is a fragmentary front elevation of the primary braking plate.

Referring now more particularly to the drawings, the numeral 10 generally designates a vehicle wheel, 11 the axle thereof and 12 the housing of the axle which, in accordance with my invention, is provided with longitudinally extending splines 13. The axle 11 may be either the stationary front axle or the rotating rear axle of a wheel and the axle housing 12 may constitute either the normal housing of the rear axles of such vehicles or an applied housing over the front axle or an associated part. In accordance with my invention, I secure to the inner face of the vehicle wheel a disk 14 having at its peripheral edge an inwardly directed flange 15, the inner edge portion of which rotatably engages a stationary plate 16 mounted upon the axle housing and stationarily secured thereto. Within the housing thus supplied and upon the splines 13, I mount a series of plates 17, 18 and 19. Guide rods 20 secured to the plate 18 project through the plates 19 and 16 and at the outer face of the plate 16 are provided with a head 21.

Between the head 21 and plate 16, a spring 22 is disposed for constantly urging the guide rods 20 and accordingly the plates 18 outwardly. A dust cap 23 houses the outer end of each guide rod 21 and its associated spring.

Secured to the outer face of the plate 16 are a plurality of cylinders 24, each having arranged therein a piston 25, the rod 26 of which extends through the plates 16 and 19 and is secured to the outer face of the plate 18. The periphery of the plate 19 has secured thereto an annular flange 27, the inner edge of which is provided with a rim flange 30 whose inner diameter is slightly less than that of the plate 18, so that while the plate 18 may move freely beneath the flange 27, it may not escape from beneath this flange. Guides 31 secured to the inner face of the plate 17 extend inwardly through the plate 18 and are provided at their inner ends with heads 32 limiting the outward movement of the plate 17 with relation to the plate 18. Between the plates, springs 33 are disposed which normally maintain these plates at their limit of separation.

The plate 17 is in the form of inner and outer rims 34 and 35 connected by segmental spokes 36. The faces of the spokes 36 and the outer rim 35 are covered by friction material, such as the usual brake lining, designated at 37. The plate 18 is in the form of a circular plate having secured thereto segmental friction elements 38 conforming in size, shape and arrangement to the spaces between adjacent segmental spokes 36 and so arranged upon the plate that their faces project therefrom a distance equal to the thickness of the friction material 37 plus the thickness of the plate 17.

It will be obvious that when the plate 18 has its front face against the rear face of the plate 17, the inner faces of the friction elements of these plates will be coplanar and will constitute a disk of friction material for coaction with the friction plate 14.

The outer face of the flange 27 is spaced from the inner face of the flange 15 a distance sufficient to accommodate an expansible band brake 39, which is preferably operated through levers 40 by a fluid pressure operated plunger 41, the cylinder 42 of which is secured to the outer face of the plate 16. Supply for all of the cylinders 24 and 42 may be derived from a pressure chamber 43 having a pedal operated piston 44 arranged therein. Suitable means may be provided for restoring any leakage to the cylinder 43, as generally indicated at 45.

It will be obvious that normally the plates 17 and 18 may be maintained in spaced relation and withdrawn beneath the flange 27. When pressure is applied to the piston 25, the braking surface of the plate 17 will be forced into engagement with the plate 14, checking operation of the vehicle. If the pressure increases beyond the pressure of the springs 33, these springs yield, permitting the plate 18 to advance and project its braking segments through the plate 17 for engagement with the plate 14. When the pressure is released, the plate 18 will be withdrawn immediately by the spring 33 and both plates will be withdrawn by the spring 22 into their position beneath the flange 27 of the plate 19. The plate 19 acts as a reinforcement for the plates 17 and 18, increasing the bearing surface between these plates and the hub or housing structure 12 at the splines 13, thus preventing the necessity for maintaining these plates excessively heavy. It also, by reason of its flange 27, acts to provide a supporting and positioning structure for the expansible band brake 39.

Since the construction hereinbefore set forth is capable of a certain range of change and modification without materially departing from the spirit of the invention, I do not limit myself to such specific structure except as hereinafter claimed.

I claim:—

1. In braking apparatus, a pair of braking elements, a third braking element with which said braking elements coact and a single means for moving the pair of braking elements into engagement with the third braking element to effect a braking action, one of said braking elements being disposed in advance and yieldably mounted to thereby permit primary engagement thereof with the third braking element and the subsequent engagement of the second braking element upon continuation of the pressure applied by said means.

2. In braking apparatus, a pair of braking elements, a third braking element with which said braking elements coact and a single means for moving the pair of braking elements into engagement with the third braking element to effect a braking action, one of said braking elements being disposed in advance and yieldably mounted to thereby permit primary engagement thereof with the third braking element and the subsequent engagement of the second braking element upon continuation of the pressure applied by said means, said pair of braking elements comprising plates having fragmentary braking surfaces combining by interdigitation to produce a complete braking surface having the same area as the plate.

3. In braking apparatus, stationary and rotatable braking elements capable of relative rotation, means for moving one of the elements toward and away from the other of the elements, one of said elements comprising a plurality of plates having interdigitating braking portions combining in one position of the plates to produce a unitary braking surface, and means normally maintaining said plates in positions where they are yieldably separated in the direction of movement of said means.

4. In braking apparatus, a rotating braking element and a stationary braking element for movement into and out of engagement with the rotatable braking element, said stationary braking element comprising a pair of plates, each of the plates having fragmentary braking surfaces thereon, means for yieldably supporting one of the plates in advance of the other plate as regards the direction of movement in engaging the rotating braking element, the last named plate having apertures permitting the passage of the braking surfaces of the other plate to thereby permit alignment of said braking surfaces.

5. In braking apparatus, a plate adapted to be secured to a rotating element, a member supporting the rotating element, a pair of plates shiftable longitudinally of said support and held against rotation with relation thereto, means yieldably holding said plates in normally spaced relation, means for urging the plate attached to the rotating element from the rotating element and braking surfaces carried by the last named plates, one of said plates having apertures through which the braking surfaces of the other of the plates extend when the pressure applied by said means overcomes the means maintaining the plates in spaced relation.

6. In braking apparatus, a plate adapted to be secured to a rotating element, a member supporting the rotating element, a pair of plates shiftable longitudinally of said support and held against rotation with relation thereto, means yieldably holding said plates in normally spaced relation, means for urging the plate attached to the rotating element from the rotating element, braking surfaces carried by the last named plates, one of said plates having apertures through which the braking surfaces of the other of the plates extend when the pressure applied by said means overcomes the means maintaining the plates in spaced relation, and a housing drum for said movable plates shifting therewith during movement of the plates toward and away from the plate secured to the rotating element.

7. In braking apparatus, a plate adapted to be secured to a rotating element, a member supporting the rotating element, a pair of plates shiftable longitudinally of said support and held against rotation with relation thereto, means yieldably holding said plates in normally spaced relation, means for urging the plate attached to the rotating element from the rotating element, braking surfaces carried by the last named plates, one of said plates having apertures through which the braking surfaces of the other of the plates extend when the pressure applied by said means overcomes the means maintaining the plates in spaced relation, and a housing drum for said movable plates shifting therewith during movement of the plates toward and away from the plate secured to the rotating element, the last named plate having a flange, the periphery of said housing and said flange combining to produce a housing for the reception of a band brake.

In testimony whereof I hereunto affix my signature.

WILLIAM WILSON.